US010369962B2

(12) United States Patent
Faruque et al.

(10) Patent No.: US 10,369,962 B2
(45) Date of Patent: Aug. 6, 2019

(54) RESTRAINT SYSTEM

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); Saeed David Barbat, Novi, MI (US); James Chih Cheng, Troy, MI (US); Robert William McCoy, Ann Arbor, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 52 days.

(21) Appl. No.: 15/594,877

(22) Filed: May 15, 2017

(65) Prior Publication Data
US 2018/0326940 A1 Nov. 15, 2018

(51) Int. Cl.
*B60R 22/405* (2006.01)
*B60R 22/28* (2006.01)
*F16F 9/53* (2006.01)
*B60R 22/34* (2006.01)

(52) U.S. Cl.
CPC .............. *B60R 22/28* (2013.01); *F16F 9/53* (2013.01); *B60R 22/341* (2013.01); *B60R 2022/282* (2013.01); *B60R 2022/288* (2013.01)

(58) Field of Classification Search
CPC .............. B60R 22/4633; B60R 2022/4661
USPC .............. 280/806, 805; 242/374, 384, 384.5
See application file for complete search history.

(56) References Cited

U.S. PATENT DOCUMENTS

| 5,492,368 | A | * | 2/1996 | Pywell | B60R 22/1952 |
| | | | | | 180/282 |
| 6,354,528 | B1 | * | 3/2002 | Nagata | B60R 22/405 |
| | | | | | 242/374 |
| 6,575,498 | B2 | | 6/2003 | Nagata et al. | |
| 7,624,940 | B2 | * | 12/2009 | Kitazawa | B60R 22/4633 |
| | | | | | 242/374 |
| 8,783,724 | B2 | | 7/2014 | Yang | |
| 8,844,857 | B2 | | 9/2014 | Shin | |
| 10,214,104 | B1 | * | 2/2019 | Jaradi | G05G 1/30 |
| 2003/0094533 | A1 | | 5/2003 | Specht et al. | |
| 2003/0122362 | A1 | * | 7/2003 | Ukita | B60R 22/1952 |
| | | | | | 280/806 |

(Continued)

FOREIGN PATENT DOCUMENTS

CN 102897139 A 1/2013
CN 104228622 A 12/2014
(Continued)

OTHER PUBLICATIONS

Search Report from United Kingdom Intellectual Property Office dated Oct. 30, 2018 regarding Application No. GB1807785.9 (4 pages).

*Primary Examiner* — Toan C To
(74) *Attorney, Agent, or Firm* — Frank A. MacKenzie; Bejin Bieneman PLC

(57) ABSTRACT

A restraint system includes a housing, a spool rotatably coupled to the housing, a pinion fixed to the spool, a rack engaged with the pinion, and a piston attached to the rack and the housing. The piston is filled with a resilient material. The resilient material may be a heterogeneous mixture of a liquid and hydrophobic, nanoporous particles.

20 Claims, 4 Drawing Sheets

(56) References Cited

U.S. PATENT DOCUMENTS

| | | | |
|---|---|---|---|
| 2003/0189331 A1 | 10/2003 | Heckmayr | |
| 2004/0169105 A1* | 9/2004 | Wier | B60R 22/4633 242/374 |
| 2006/0042850 A1 | 3/2006 | Mendis | |
| 2006/0157607 A1* | 7/2006 | Kohlndorfer | B60R 22/4633 242/374 |
| 2010/0051733 A1* | 3/2010 | Yamada | B21C 23/205 242/374 |
| 2012/0013111 A1* | 1/2012 | Nagata | B60R 22/4633 280/806 |
| 2012/0032017 A1* | 2/2012 | Yanagawa | B60R 22/4633 242/374 |
| 2014/0145021 A1* | 5/2014 | Yanagawa | B60R 22/4633 242/374 |

FOREIGN PATENT DOCUMENTS

| | | |
|---|---|---|
| CN | 104228929 A | 12/2014 |
| DE | 102004051415 A1 | 4/2006 |
| FR | 2276962 A2 | 1/1976 |
| GB | 2505308 A | 2/2014 |
| JP | 4153129 B2 | 9/2008 |
| JP | 2013023015 A | 2/2013 |
| KR | 1020060054684 A | 5/2006 |

\* cited by examiner

RESTRAINT SYSTEM

BACKGROUND

Vehicles include seatbelts for each of the seats onboard. The seatbelt includes webbing that, when the seatbelt is buckled, stretches across an occupant of the seat. An anchor attaches one end of the webbing to a seat frame. The other end of the webbing feeds into a retractor, which includes a spool that pays out and retracts the webbing. A clip slides freely along the webbing and, when engaged with a buckle, divides the webbing into a lap band and a shoulder band. The seatbelt is typically a three-point harness, meaning that the webbing is attached at three points around the occupant when fastened: the anchor, the retractor, and the buckle.

DETAILED DESCRIPTION

A restraint system includes a housing, a spool rotatably coupled to the housing, a pinion fixed to the spool, a rack engaged with the pinion, and a piston attached to the rack and the housing and filled with a resilient material.

The resilient material may be a heterogeneous mixture of a liquid and hydrophobic, nanoporous particles. The piston may include a piston head attached to the rack and a piston cylinder attached to the housing. The particles may have nanopores, and the piston head may be movable relative to the piston cylinder from a first position in which the nanopores are substantially filled with air to a second position in which the nanopores are substantially filled with the liquid. A volume of the heterogeneous mixture when the piston head is in the second position may be at most half of a volume of the heterogeneous mixture when the piston head is in the first position. The piston head is movable relative to the piston cylinder from the second position in which the nanopores are substantially filled with the liquid to the first position in which the nanopores are substantially filled with air.

The heterogeneous mixture may be a colloid of hydrophobic nanoporous particles in a liquid. The particles may be formed of silica. The particles may have a hydrophobic surface treatment.

The restraint system may include webbing fixed to the spool. The restraint system may include a retractor, and the webbing may extend from a first end fixed to the spool to a second end retractably attached to the retractor. The webbing may be wrapped around the spool.

The spool may define a spool axis, and the pinion may be centered on the spool axis. The piston may define a piston axis, and the rack may be movable parallel to the piston axis while engaged with the pinion.

The restraint system may include a seat, and the housing may be fixed to the seat.

The restraint system may include a buckle attached to the spool.

The restraint system provides load limiting during sudden decelerations, e.g., from an impact. The load limiting may reduce a maximum force imparted to an occupant via the webbing and may thus reduce injuries experienced by the occupant, e.g., may reduce chest compression of the occupant. The resilient material may absorb energy while allowing some extraction of the webbing from the spool, thus mitigating an increase in tension in the webbing during the sudden deceleration. Furthermore, the restraint system may be reusable, that is, does not have to be replaced after engagement during a sudden deceleration.

Figure 1:
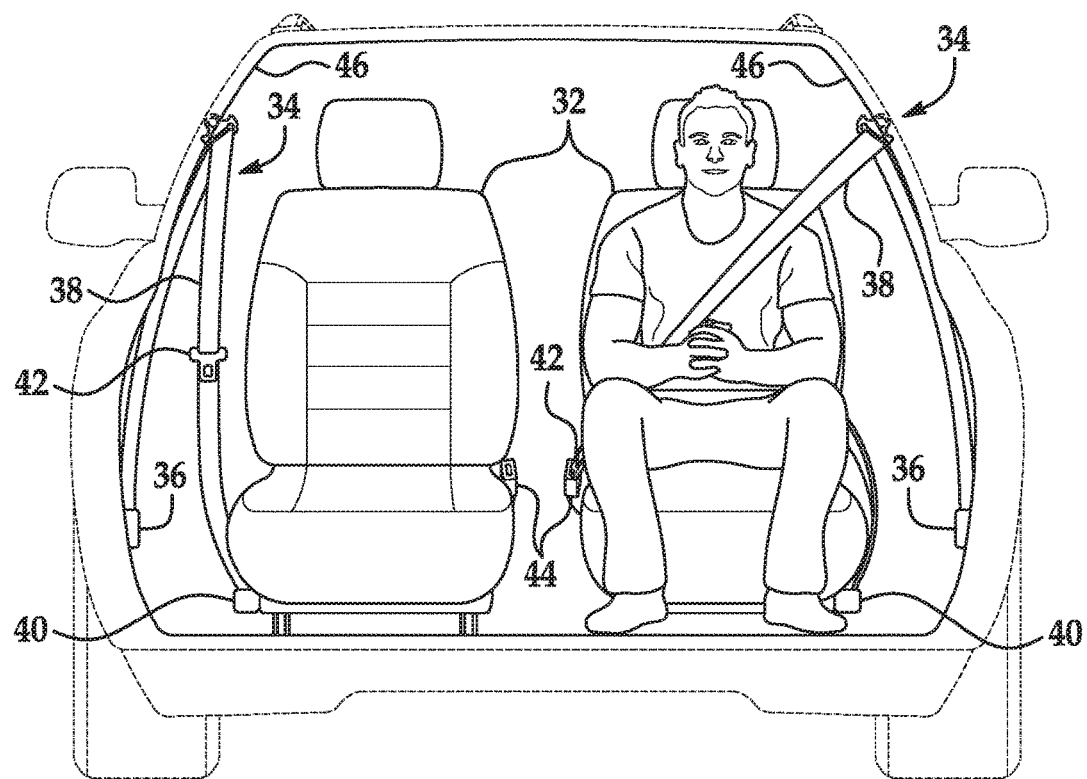
FIG. 1 is a front view of vehicle seats with a restraint systems in a vehicle.

With reference to FIG. 1, a vehicle 30 includes a seat 32 that may support an occupant. The seat 32 may be a front seat or a rear seat, and may be in any cross-vehicle position. The seat 32 shown in FIG. 1 is a bucket seat, but alternatively the seat 32 may be a bench seat or another type of seat.

A restraint system 34 of the vehicle 30 may include a retractor 36, webbing 38 retractably payable from the retractor 36, an anchor 40 coupled to the webbing 38, and a clip 42 that engages a buckle 44. The restraint system 34, when fastened, retains the occupant on the seat 32, e.g., during sudden decelerations of the vehicle 30.

The restraint system 34 of FIG. 1 is a three-point harness, meaning that the webbing 38 is attached at three points around the occupant when fastened: the anchor 40, the retractor 36, and the buckle 44. The restraint system 34 may, alternatively, include another arrangement of attachment points.

With continued reference to FIG. 1, the retractor 36 may be attached to a body (not numbered) of the vehicle 30, e.g., to a B pillar 46 in the instance the seat 32 is a front seat, to a C pillar (not shown) when the seat 32 is a rear seat, etc. The retractor 36 may alternatively be mounted to the seat 32.

Figure 2:
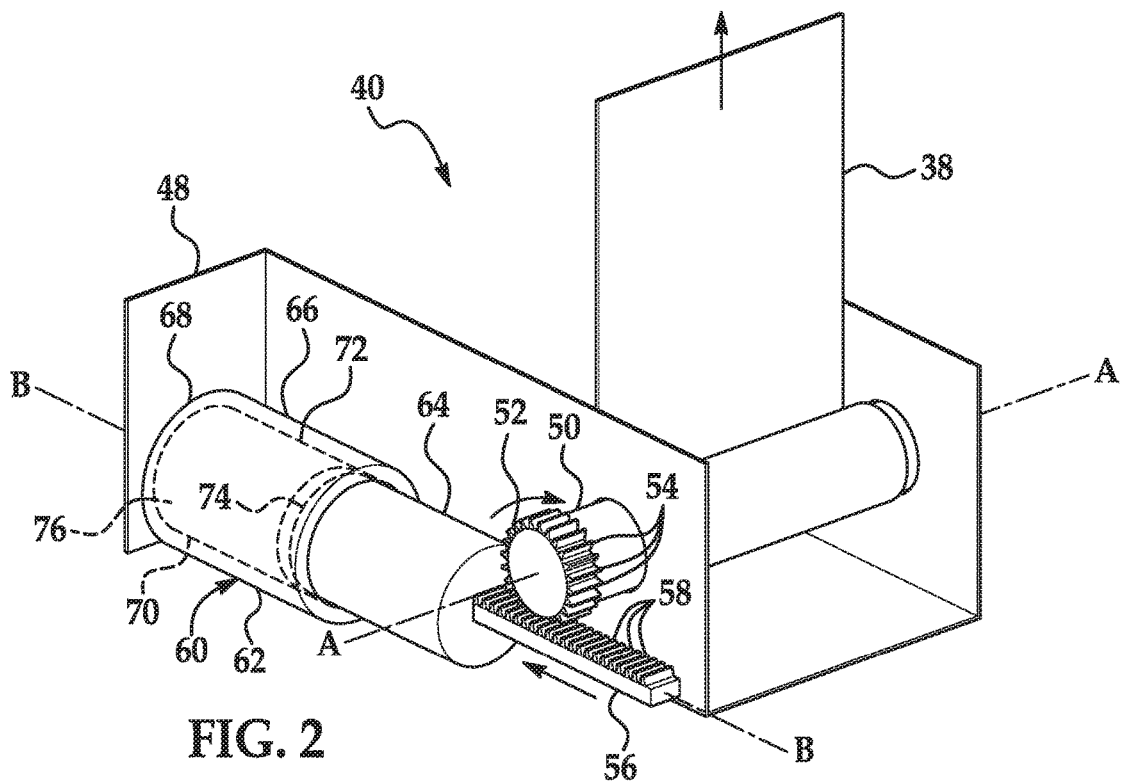
FIG. 2 is a perspective view of an anchor of the restraint system with a cylinder head in a first position.
Figure 3:
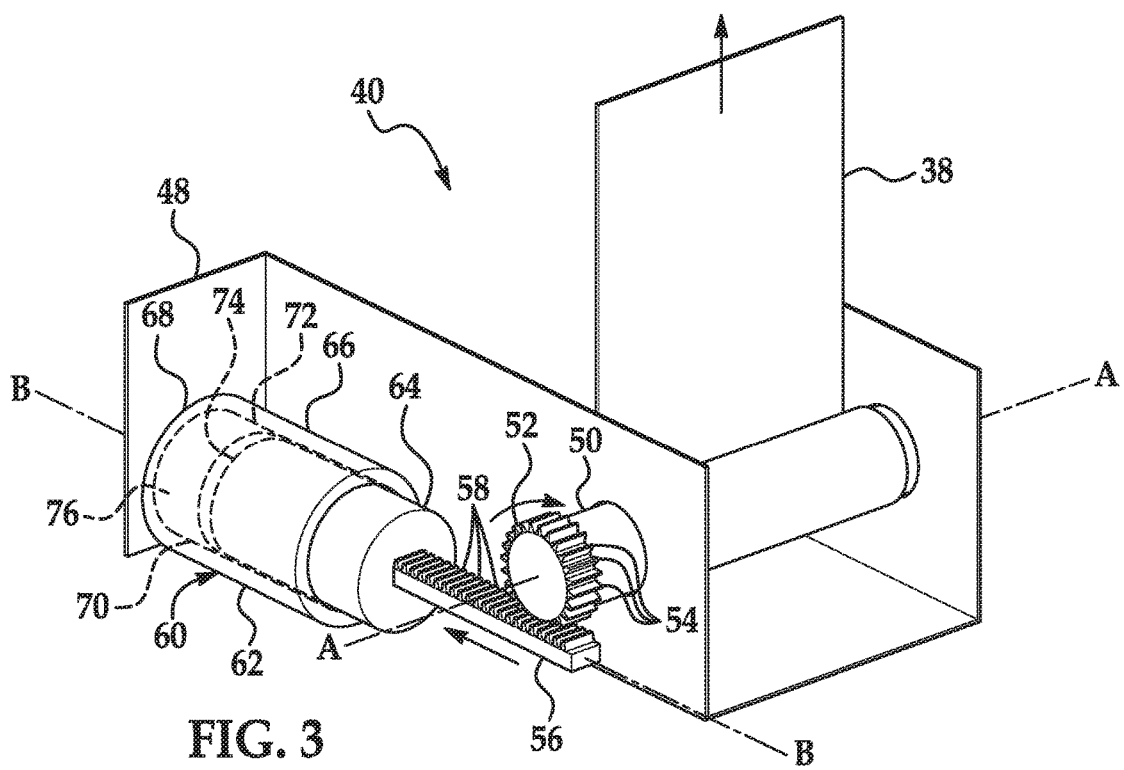
FIG. 3 is a perspective view of the anchor of the restraint system with the cylinder head in a second position.

With reference to FIGS. 2 and 3, the anchor 40 includes a housing 48. The housing 48 may be fixed to the seat 32 or may be fixed to the body of the vehicle 30. The housing 48 attaches other components of the anchor 40 to the seat 32 or the body. The housing 48 may be rigid and formed of, e.g., metal or plastic.

A spool 50 is rotatably coupled to the housing 48. The spool 50 may have a cylindrical shape. The spool 50 may define a spool axis A. The spool axis A may be an axis of rotation of the spool 50 and/or a center line of the cylindrical shape of the spool 50.

The webbing 38 is fixed to the spool 50. The webbing 38 extends from a first end fixed to the spool 50 to a second end retractably attached to the retractor 36. The anchor 40 may attach the first end of the webbing 38 to the seat 32 or to the body of the vehicle 30. The webbing 38 may be wrapped around the spool 50, starting at the first end. The clip 42 may slide freely along the webbing 38 and, when engaged with the buckle 44, may divide the webbing 38 into a lap band and a shoulder band.

Alternatively to the webbing 38 being fixed to the spool 50, the buckle 44 may be attached to the spool 50. A cord or strap may extend from the buckle 44 to the spool 50 and be wrapped around the spool 50.

With continued reference to FIGS. 2 and 3, a pinion 52 is fixed to the spool 50. The pinion 52 may be centered on the spool axis A. The pinion 52 may have a plurality of gear teeth 54 arranged radially about the spool axis A. The pinion 52 may rotate with the spool 50 about the spool axis A.

A rack 56 is engaged with the pinion 52. The rack 56 may have a plurality of gear teeth 58 linearly arranged. The rack 56 may be positioned so that the gear teeth 58 of the rack 56 mesh with the gear teeth 54 of the pinion 52. In other words, the rack 56 is positioned at a radius of the pinion 52 from the spool axis A. The gear teeth 58 may be arranged along a straight line, which is parallel to a piston axis B, described below. The rack 56 is movable along the straight line while engaged with the pinion 52. The straight line is tangent to a circle defined by the pinion 52, specifically, by the arrangement of gear teeth 54 of the pinion 52. The straight line is parallel to a piston axis B, described below. As shown in FIGS. 2 and 3, the straight line may be identical to the piston axis B.

A piston 60 is attached to the rack 56 and the housing 48. The piston 60 includes a piston cylinder 62 and a piston head 64. The piston cylinder 62 may be attached to the housing 48, and the piston head 64 may be attached to the rack 56, as shown in FIGS. 2 and 3, or vice versa. The piston head 64 may be attached to an end of the rack 56. The piston 60 defines the piston axis B, along which the piston head 64 moves relative to the piston cylinder 62.

The piston cylinder 62 may have a tube 66 and a wall 68 at an end of the tube 66. The tube 66 may have a constant cross-section along the piston axis B. The tube 66 may have a circular cross-section. The wall 68 may have a circular shape and may enclose one end of the tube 66.

The piston cylinder 62 has a chamber 70. The tube 66 and the wall 68 may define the chamber 70. The chamber 70 may have a constant cross-section along the piston axis B. The chamber 70 may have a circular cross-section.

The piston head 64 may have a circular cross-section with a diameter slightly smaller than a diameter of the chamber 70. The piston head 64 may be positioned in the chamber 70 and may enclose the chamber 70. The piston head 64 and the chamber 70 may define a sealed volume 72. An o-ring 74 may extend around the piston head 64. The o-ring 74 may form a seal between the piston head 64 and the tube 66 of the piston cylinder 62.

The piston head 64 may be linearly movable in the chamber 70. The piston head 64 may be movable along the piston axis B. The piston head 64 may be movable from a first position, as shown in FIG. 2, to a second position, as shown in FIG. 3. The sealed volume 72 is smaller when the piston head 64 is in the second position than in the first position.

A resilient material 76 is enclosed by the piston head 64 in the chamber 70. In other words, the chamber 70 and the piston head 64 contain the resilient material 76 and prevent the resilient material 76 from freely flowing out of the chamber 70. The resilient material 76 may fill the sealed volume 72; in other words, the sealed volume 72 may contain only the resilient material 76.

The resilient material 76 is a substance that is reversibly compressible. In other words, the resilient material 76 is able to be compressed into a smaller volume and then expand back to an original volume. The resilient material 76 may be solid, liquid, gas, or a combination of two or three of solid, liquid, and gas.

With reference to FIGS. 3 and 4, the resilient material 76 may be a heterogeneous mixture 78 of a liquid 80 and hydrophobic, nanoporous particles 82. A "heterogeneous mixture" is made of different substances that remain separate, e.g., a colloid or a suspension. For example, the heterogeneous mixture 78 may be a colloid of the hydrophobic nanoporous particles 82 in the liquid 80. The liquid 80 may be any inert, i.e., nonreactive, liquid, e.g., water, lithium chloride, etc.

The particles 82 are nanoporous; in other words, the particles 82 have nanopores 84. The nanopores 84 may have diameters on the order of 1 nm to 100 nm. The particles 82 may be formed of, e.g., silica. The particles 82 are hydrophobic, that is, tending to repel water or fail to mix with water. The particles 82 may be formed of a material that is hydrophobic, or the particles 82 may have a hydrophobic surface treatment, e.g., chlorotrimethylsilane or chlorodimethyloctylsilane in toluene.

Figure 5:
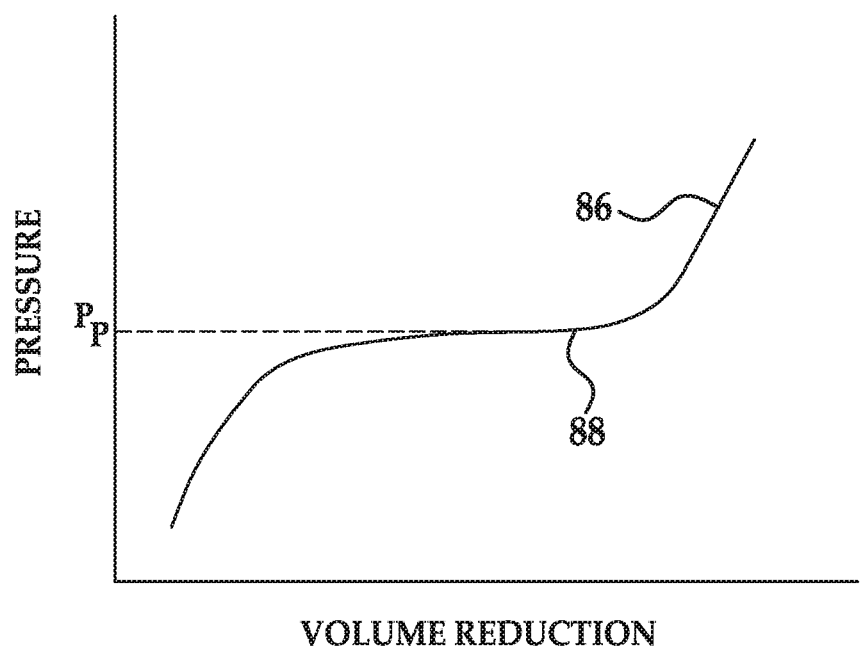
FIG. 5 is a graph of pressure in the heterogeneous mixture versus volume reduction.

FIG. 5 is a graph of a curve 86 describing the relationship between a volume reduction of the heterogeneous mixture 78 and the pressure experienced by the heterogeneous mixture 78. As a volume occupied by the heterogeneous mixture 78 decreases, the pressure initially increases relatively steeply. As the volume continues to decrease, the pressure nears a plateau pressure $P_P$ and does not increase or increases only relatively slowly, as shown over a plateau region 88 of the curve 86. Over the plateau region 88, the slope of the curve 86, that is, the rate of change of pressure per unit of volume reduction, is less than the slope of other regions of the curve 86. The plateau pressure $P_P$ may be at an inflection point of the curve 86 in the plateau region 88, that is, the point at which a change in the direction of curvature of the curve 86 occurs, that is, a point separating a region of the curve 86 with decreasing slope from a region of the curve 86 with increasing slope. After the plateau region 88, as the volume continues to decrease, the pressure rises more quickly than in the plateau region 88.

Figure 4A:
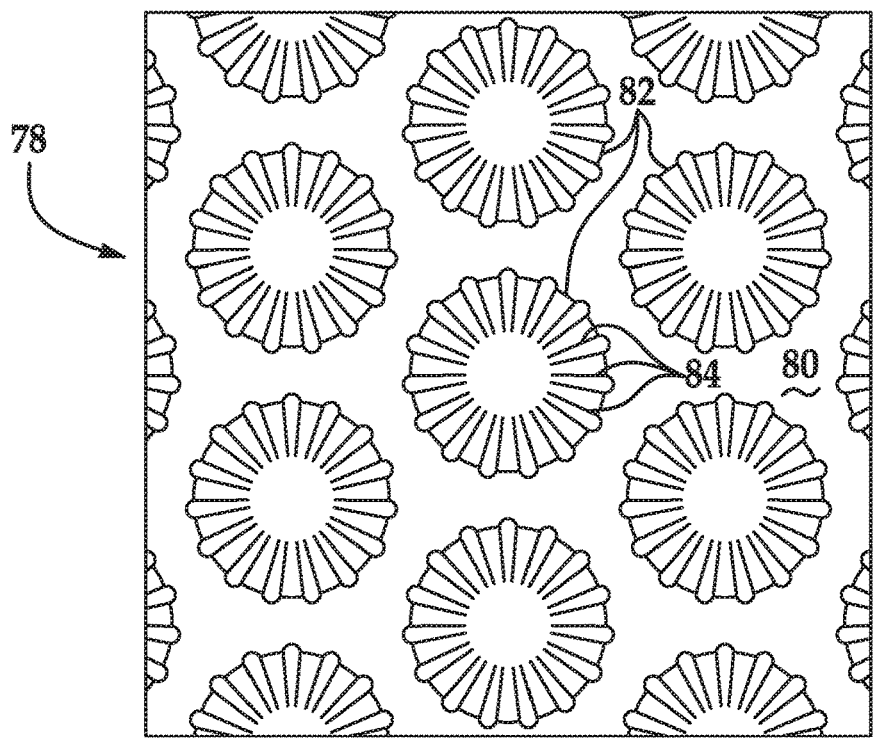
FIG. 4A is a diagram of a heterogeneous mixture when uncompressed.
Figure 4B:
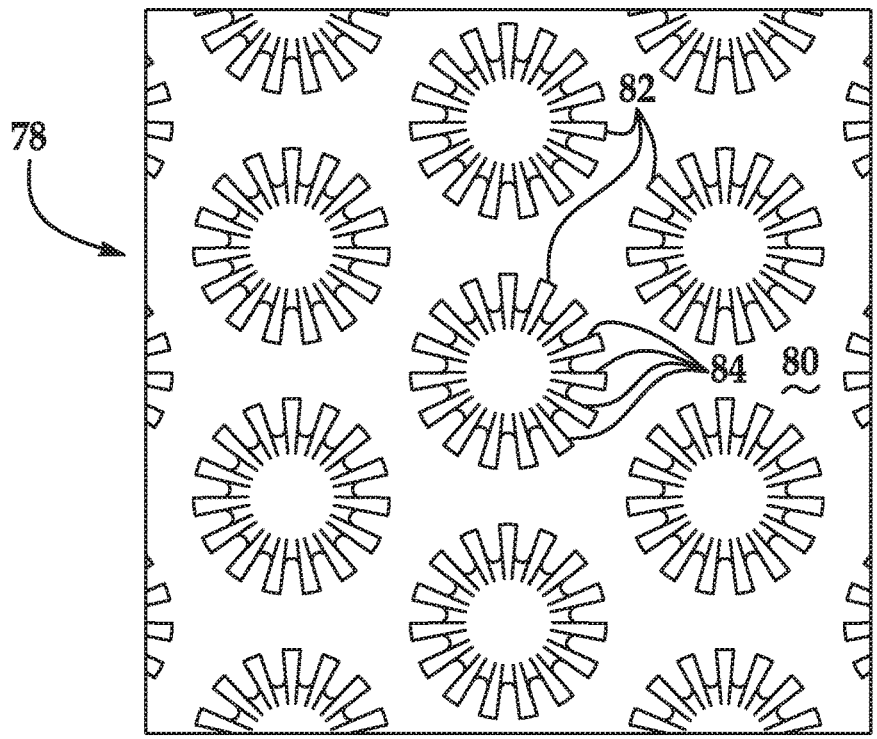
FIG. 4B is a diagram of the heterogeneous mixture when compressed.

With reference to FIGS. 4A-B, physically, before the volume reduces, air fills the nanopores 84 of the particles 82, and surface tension prevents the liquid 80 from entering the nanopores 84, as shown in FIG. 4A. In the plateau region 88, the pressure becomes sufficient to overcome the surface tension, and the liquid 80 enters the nanopores 84 and compresses the air inside the nanopores 84, as shown in FIG. 4B. Once the nanopores 84 are mostly full of the liquid 80, as the volume reduces, the pressure increases more substantially. The volume may be reduced by as much as 80%. The plateau pressure $P_P$ and the length of the plateau region 88 are affected by the choice of material for the particles 82, the average size of the particles 82, the number of nanopores 84 per particle, the average size of the nanopores 84, the surface treatment, and the choice of liquid 80.

The piston head 64 is movable relative to the piston cylinder 62 from the first position in which the nanopores 84 are substantially filled with air to the second position in which the nanopores 84 are substantially filled with the liquid 80. The volume of the heterogeneous mixture 78 when the piston head 64 is in the second position may be at most half of the volume, i.e., half or less than half of the volume, e.g., as little as 20% of the volume, of the heterogeneous mixture 78 when the piston head 64 is in the first position. As the piston head 64 moves from the first position to the second position, the pressure in the heterogeneous mixture 78 follows the curve 86 in FIG. 5; because the chamber 70 has a constant cross-sectional area, the distance traveled by the piston head 64 is linearly related to the volume reduction.

The piston head 64 is movable relative to the piston cylinder 62 from the second position in which the nanopores 84 are substantially filled with the liquid 80 to the first position in which the nanopores 84 are substantially filled with air. In other words, the compression is reversible. When a force on the piston head 64 tending to compress the heterogeneous mixture 78 is removed, the internal pressure of the heterogeneous mixture 78 pushes the piston head 64 away from the second position toward the first position. The compression may be fully or partially reversible, that is, the internal pressure may move the piston head 64 back to the first position or a fraction of the way back to the first position, such as 95%.

In the event of a sudden deceleration, such as caused by an impact, an occupant of the seat 32 may have forward momentum relative to the seat 32. The occupant pushes against the webbing 38, putting the webbing 38 under tension. The webbing 38 pulls on the spool 50, tending to rotate the spool 50 and unwrap the webbing 38 from the spool 50. The pinion 52 rotates with the spool 50. The pinion 52 pushes the rack 56 via the gear teeth 54, 56. The rack 56 pushes the piston head 64, starting at the first position, toward the second position. The piston head 64 compresses the heterogeneous mixture 78. FIG. 5 shows the curve 86 of the pressure of the heterogeneous mixture 78 as a function of volume reduction, which is linearly related to stroke distance of the piston 60. In the plateau region 88 of the curve 86, the rise of the tension in the webbing 38 is limited by the plateau pressure $P_P$. The force imparted by the webbing 38 to the occupant is also thus limited while the piston head 64 is in the plateau region 88. In other words, the anchor 40 provides load limiting. Once the tension in the webbing 38 is reduced back to normal levels, the piston head 64 moves back toward the first position. The piston 60 may thus be reusable.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   a housing;
   a spool rotatably coupled to the housing;
   a pinion fixed to the spool;
   a rack engaged with the pinion; and
   a piston attached to the rack and the housing and filled with a heterogeneous mixture of a liquid and hydrophobic, nanoporous particles.

2. The restraint system of claim 1, wherein the piston includes a piston head attached to the rack and a piston cylinder attached to the housing.

3. The restraint system of claim 2, wherein the particles have nanopores, and the piston head is movable relative to the piston cylinder from a first position in which the nanopores are substantially filled with air to a second position in which the nanopores are substantially filled with the liquid.

4. The restraint system of claim 3, wherein a volume of the heterogeneous mixture when the piston head is in the second position is at most half of a volume of the heterogeneous mixture when the piston head is in the first position.

5. The restraint system of claim 3, wherein the piston head is movable relative to the piston cylinder from the second position in which the nanopores are substantially filled with the liquid to the first position in which the nanopores are substantially filled with air.

6. The restraint system of claim 1, wherein the heterogeneous mixture is a colloid of hydrophopic nanoporous particles in a liquid.

7. The restraint system of claim 1, wherein the particles are formed of silica.

8. The restraint system of claim 7, wherein the particles have a hydrophobic surface treatment.

9. The restraint system of claim 1, further comprising webbing fixed to the spool.

10. The restraint system of claim 9, further comprising a retractor, wherein the webbing extends from a first end fixed to the spool to a second end retractably attached to the retractor.

11. The restraint system of claim 9, wherein the webbing is wrapped around the spool.

12. The restraint system of claim 1, wherein the spool defines a spool axis, and the pinion is centered on the spool axis.

13. The restraint system of claim 12, wherein the piston defines a piston axis, and the rack is movable parallel to the piston axis while engaged with the pinion.

14. The restraint system of claim 1, further comprising a seat, wherein the housing is fixed to the seat.

15. The restraint system of claim 1, further comprising a buckle attached to the spool.

16. A restraint system comprising:
    a housing;
    a spool rotatably coupled to the housing;
    a pinion fixed to the spool;
    a rack engaged with the pinion; and
    a piston including a piston head attached to the rack and a piston cylinder attached to the housing, the piston head and the piston cylinder defining a volume filled with a resilient material;
    wherein the piston head is movable in the piston cylinder between a first position and a second position in which the volume is smaller than the first position, the resilient material biasing the piston head from the second position to the first position.

17. The restraint system of claim 16, further comprising webbing fixed to the spool.

18. The restraint system of claim 17, further comprising a retractor, wherein the webbing extends from a first end fixed to the spool to a second end retractably attached to the retractor.

19. The restraint system of claim 16, wherein the spool defines a spool axis, and the pinion is centered on the spool axis.

20. The restraint system of claim 16, wherein the resilient material is a heterogeneous mixture of a liquid and hydrophobic, nanoporous particles.

* * * * *